United States Patent
Perdue

(10) Patent No.: US 7,497,524 B2
(45) Date of Patent: Mar. 3, 2009

(54) SYSTEM FOR SIGNALING POTENTIAL UNINTENDED APPLICATION OF PARK AIR BRAKE IN A VEHICLE HAVING A LIFT PLATFORM

(75) Inventor: David Perdue, Charleston, WV (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 190 days.

(21) Appl. No.: 11/621,264

(22) Filed: Jan. 9, 2007

(65) Prior Publication Data
US 2008/0164104 A1 Jul. 10, 2008

(51) Int. Cl.
*B60T 13/00* (2006.01)
(52) U.S. Cl. .................... 303/7; 303/3; 303/15
(58) Field of Classification Search ............. 303/3, 303/7, 15; 5/81.1 R
See application file for complete search history.

(56) References Cited

U.S. PATENT DOCUMENTS

| 3,403,945 | A * | 10/1968 | Dewar et al. ............. 303/115.3 |
| 6,264,286 | B1 * | 7/2001 | Ehrlich et al. ................. 303/7 |
| 2003/0172837 | A1 * | 9/2003 | Whiston et al. .......... 105/215.2 |
| 2006/0011421 | A1 * | 1/2006 | Connors et al. ................ 188/5 |
| 2007/0079438 | A1 * | 4/2007 | Patterson .................. 5/81.1 C |

* cited by examiner

*Primary Examiner*—Christopher P Schwartz
(74) *Attorney, Agent, or Firm*—Mark C. Bash; Jeffrey P. Calfa

(57) ABSTRACT

A method for warning a driver of a moving vehicle of potential imminent unintended application of a park brake because of an indication that a motorized lift (12) is out-of-stow. A processor (68) executes an algorithm for issuing an alarm to signal the driver when air pressure in a line (46) to a device (50) that is holding the park brake released has decreased to pressure somewhat greater than that which will cause the park brake to be automatically applied, allowing the driver some measure of time to park the vehicle before the park brake is applied.

4 Claims, 4 Drawing Sheets

SYSTEM FOR SIGNALING POTENTIAL UNINTENDED APPLICATION OF PARK AIR BRAKE IN A VEHICLE HAVING A LIFT PLATFORM

FIELD OF THE INVENTION

This invention relates to a motor vehicle having a lift platform that when the vehicle is parked, can be deployed and then operated to lift and lower an object, such as a person seated in a wheelchair, between the vehicle floor and ground level, and that thereafter is placed in stowed position when the vehicle is ready to be driven.

BACKGROUND OF THE INVENTION

Certain vehicles have motorized lifts for raising and lowering large objects to facilitate loading them into and unloading them from space inside the vehicle. One example of such a device is a wheelchair lift. Various models of wheelchair lifts are commercially available. One type comprises a platform that when placed generally horizontally either on the floor of a vehicle or on ground adjacent the vehicle allows a wheelchair to be rolled onto and off it. With a wheelchair having been placed on the platform, the platform can be raised and/or lowered to move the wheelchair to and from floor- and/or ground-level. The lift is motorized, comprising a prime mover and associated mechanism for raising and lowering the platform. When unoccupied, the platform can be operated to a stowed position in preparation for the vehicle to be driven.

A motor vehicle having a wheelchair lift is subject to U.S. government regulations, as specified in FMVSS. One requirement mandates that the vehicle be rendered immovable when the lift is out of stow. One means for compliance with that requirement comprises automatically operating a vehicle's park brake to apply a holding or locking force to vehicle wheels when the vehicle is stopped thereby preventing the vehicle from moving.

In certain vehicles the park brake uses an on-board pressurized air supply to keep the park brake at each wheel from otherwise being automatically applied by a device, sometimes called a SAAR (meaning spring actuated, air released) for short. Application of a park brake occurs when the air supply to the SAAR is shut off, allowing the spring force of the SAAR to be effective to lock the wheels. Pressurized air must be applied to the SAAR in order to release the park brake.

The driver can apply and release the park brake by operating a "push-pull-double-check" (PPDC) valve, sometimes referred to as a "park brake knob". For compliance with applicable wheelchair lift regulations, a vehicle may have a solenoid-operated interlock valve for causing the compressed air supply to the park brake knob to be shut off when the wheelchair lift is out of stow. A supply valve is caused to open by compressed air pressure being applied through the interlock valve to a pilot port when a switch or sensor signals that the wheelchair lift is in stow, thereby enabling the supply valve to open and pass compressed air from a supply port to a delivery port so that the park brake knob can apply and release the park brake.

SUMMARY OF THE INVENTION

The present invention arises in consequence of the recognition of the possibility that the supply valve could, for any of several reasons, cause the compressed air supply to be shut off to the park brake knob while the vehicle is being driven. Were that to happen, compressed air would become trapped in the line leading to the SAAR. As long as that pressure were to be maintained, the park brake would continue to be held released. Failure to maintain that pressure, such as through leakage, could however lead to unintended release of the SAAR, and hence possible application of the park brake while the vehicle is moving.

The present invention provides a solution that is intended to alert the driver to the possible incipiency of unintended application of the park brake in such a situation.

Possible reasons for unintended trapping of compressed air in the line to the SAAR while the vehicle is in motion include failure of a component or wiring in the portion of the electrical system associated with the lift, and loss of proper adjustment of a switch or switches in that portion of the electrical system for sensing that the lift has been stowed and/or any associated door has been fully closed.

Leakage from air lines in a vehicle like a truck or bus can occur at joints and connections along the lines, and normally small amounts of leakage, which may be virtually unnoticeable, are tolerable when all components of a particular system are fully functional. That is because the pressurized air source can make up for the leakage loss. In the case of the park brake system that has been described above, the potential exists for connections in the line to the SAAR to leak.

When the lift is indicated to be out-of-stow, resulting in compressed air becoming trapped in the line to the SAAR, and if a leak is present in that line, pressure loss from such a leak cannot be made up because the supply valve is not kept open by pilot pressure. A sufficiently large pressure loss in the air line to the SAAR will cause the park brake to be automatically applied. If the leak is small, the pressure loss may take a long time to occur, but in any event, trapping compressed air in the line to the SAAR while the vehicle is being driven is considered undesirable.

The present invention employs an efficient use of components and materials in conjunction with existing vehicle systems to provide a signal for alerting the driver to the possible incipiency of unintended application of the park brake due to loss of pressure in the line to the SAAR.

The invention contemplates that the driver, upon being alerted, will have sufficient time to drive to a suitable stopping place where the vehicle can be stopped and parked.

In a specific embodiment to be described here, a tee is connected into the air line to the SAAR, and a pressure switch is connected to the third port of the tee. The pressure switch is electrically connected to the vehicle electrical system. Advantageous use is also made both of existing information in the electrical system controller and of existing warning devices.

According to one generic aspect, the invention relates to a motor vehicle comprising a park brake for wheels on which the vehicle travels, a pressurized air source, and an air circuit for controlling an operating device for the park brake to unlock the wheels when pressurized air from the source is acting on the operating device through an air line leading to the device with nominal pressure that assures unlocking of the wheels and to lock the wheels when air pressure in the air line is less than some minimum pressure for keeping the wheels locked.

The vehicle has a lift that is selectively operable to an out-of-stow position that allows the lift to be used when the vehicle is parked and to a stowed position that does not allow use of the lift. A selectively operable lift interlock valve is connected in the air circuit for allowing pressurized air from the source to act on the operating device whenever the lift is indicated to be in stowed position and for blocking the air line leading to the device whenever the lift is indicated to be in out-of-stow position.

A pressure-sensitive device senses air pressure in the air line leading to the operating device. An indicator is operated by the pressure-sensitive device when air pressure in the air line leading to the operating device has decreased significantly from the nominal pressure, but is still greater than the minimum pressure, to indicate the possibility of imminent locking of the wheels.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
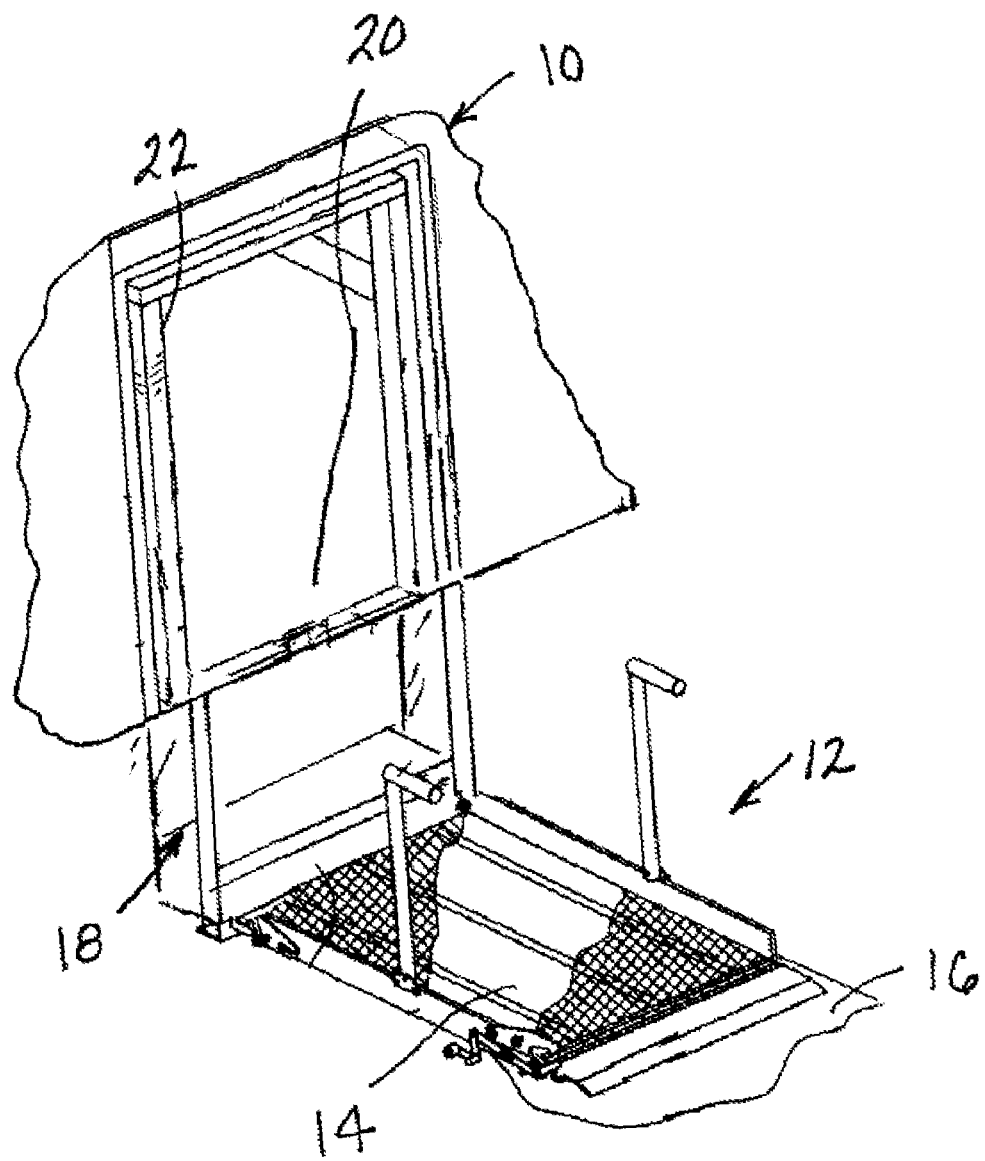
FIG. 1 is a fragmentary perspective view of a side of a vehicle, such as a passenger bus, showing a wheelchair lift in a deployed position.

FIG. 1 shows an entry side of a passenger bus 10 from which a wheelchair lift 12 has been deployed to place a lift platform 14 generally horizontally on the adjacent ground surface 16 where a wheelchair (not shown) can be rolled onto and off it. After the wheelchair has been rolled onto platform 14, a lift mechanism 18 is operated by a prime mover, such as a motor, to raise platform 14 to the level of a floor 20 of the bus, allowing the wheelchair to be rolled into the bus interior through a door opening 22. Unloading of the wheelchair is accomplished in the opposite manner. When platform 14 is unoccupied, it and the associate mechanism connected to it can be operated to a stowed position inside the bus, possibly with platform 14 covering door opening 22 itself, or at least assuming a position that allows a separate door (not shown) to close door opening 22.

Bus 10 has hydraulic service brakes at its wheels. It also has a park brake 24 (see FIG. 2) that is held released by pressure of compressed air being applied to a SAAR (spring apply, air release) device 50 associated with each wheel that has a park brake mechanism. With bus 10 parked, the pressurized air in device 50 can be exhausted to release a spring whose force is then applied to lock the respective wheel. When the park brake is to be released, compressed air is delivered to device 50 to overcome the spring force being applied to the park brake mechanism at the respective wheel, thereby releasing the spring and unlocking the wheel.

Figure 2:
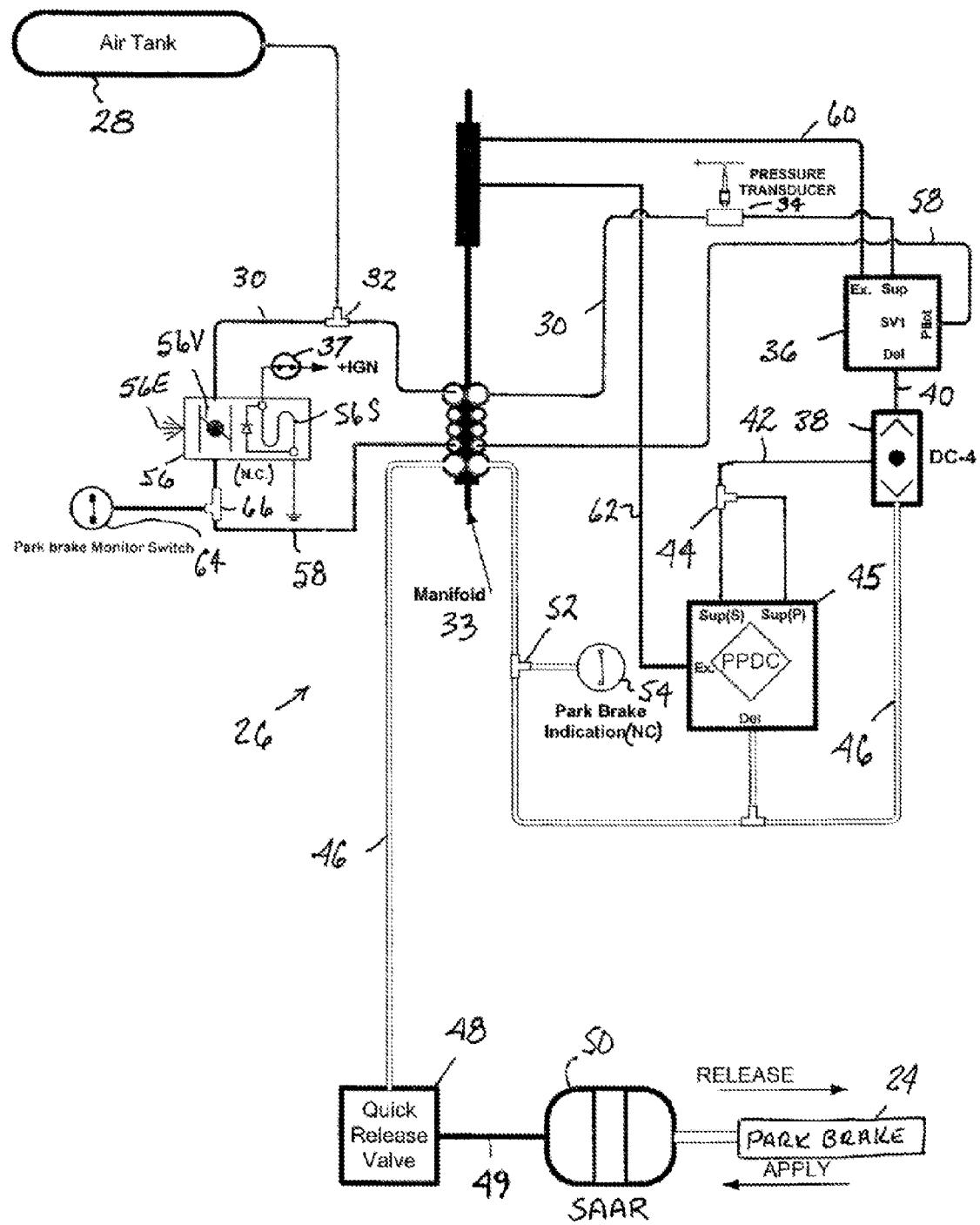
FIG. 2 is a schematic diagram of an air circuit that is associated with a park brake knob and park brake, that has an interlock with the wheelchair lift shown in FIG. 1, and that embodies principles of the present invention.

FIG. 2 further shows an air circuit 26 that is associated with park brake 24. An air tank 28 provides a source of pressurized air that is delivered into an air line 30 via one port of a tee 32. Line 30 extends from a second port of tee 32 through a manifold 33 and then a pressure transducer 34 to a supply port of a pilot-operated supply valve 36 that has a delivery port connected to one port of a double check valve 38 by an air line 40.

An air line 42 that branches at a tee 44 connects a second port of double check valve 38 to primary and secondary supply ports of a PPDC valve, or park brake knob, 45. An air line 46 connects a third port of double check valve 38 to both a delivery port of PPDC valve 45 and a port of a quick release valve 48, passing to the latter through manifold 33. An air line 49 connects another port of valve 48 to a SAAR device 50. A tee 52 in air line 46 provides for line pressure to be communicated to a park brake indication switch 54 that is normally closed (NC) and that is connected to the vehicle electrical system. Supply valve 36, double check valve 38, and park brake knob 45 collectively provide one example of a means for applying and releasing the park brake when the lift is in stow.

From a third port of tee 32, air line 30 extends to an inlet port of a park brake interlock solenoid valve 56 that has a normally closed valve element 56V and a solenoid 56S that when energized operates valve element 56V to open valve 56. Solenoid 56S is fed from the ignition terminal IGN of the vehicle ignition switch through a switch 37 that distinguishes between the lift being in stow and out-of-stow. With the vehicle engine running, the energization/de-energization of solenoid 56S is controlled by switch 37.

An air line 58 connects an outlet port of valve 56 through manifold 33 to a pilot port of supply valve 36. An exhaust line 60 provides for venting from an exhaust port of valve 36, as does an exhaust line 62 from an exhaust port of PPDC valve 45. A park brake monitor switch 64 is communicated to pressure in air line 58 via a tee 66.

Figure 3:
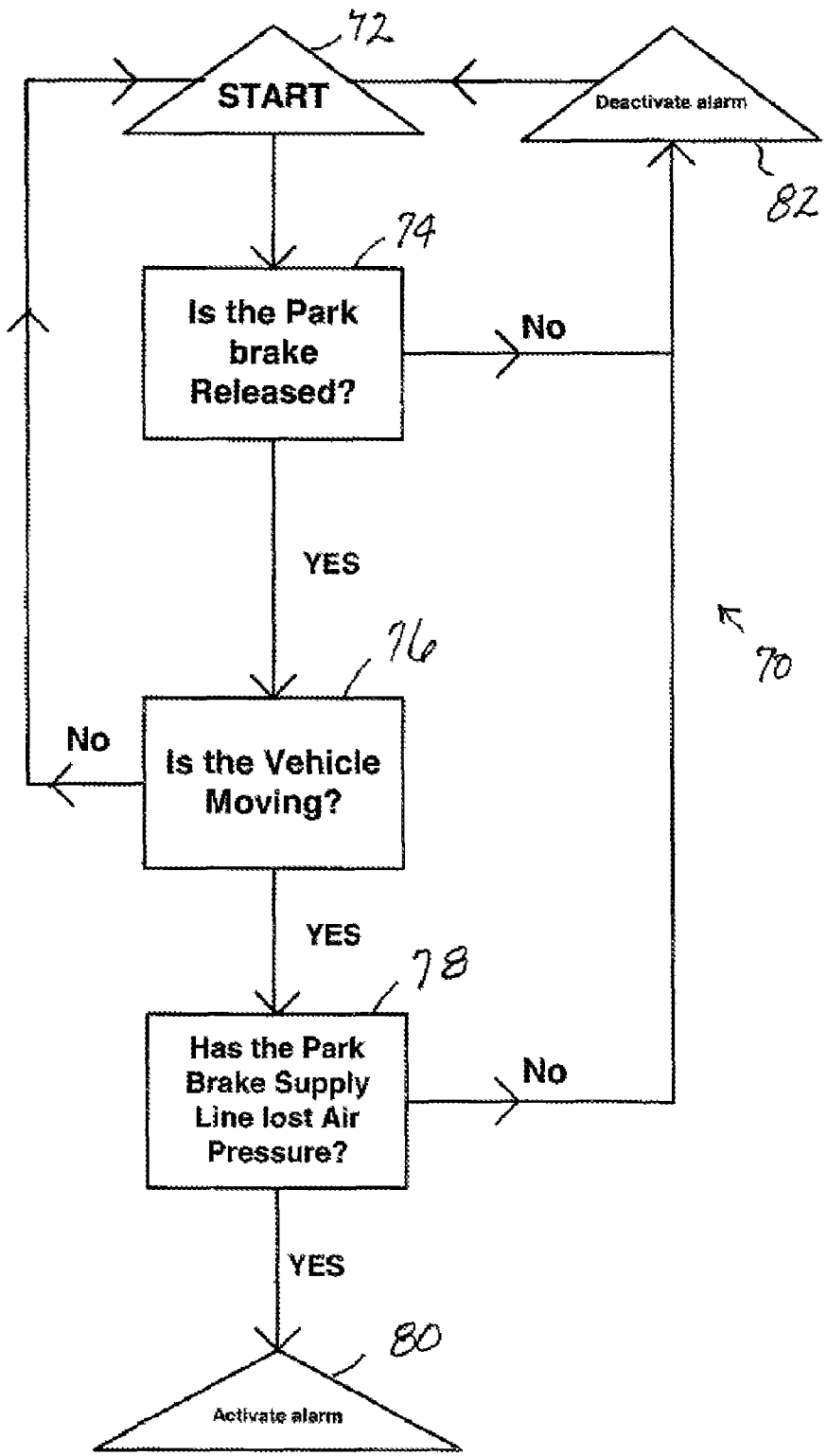
FIG. 3 is a strategy diagram that implements principles of the invention in the vehicle.
Figure 4:
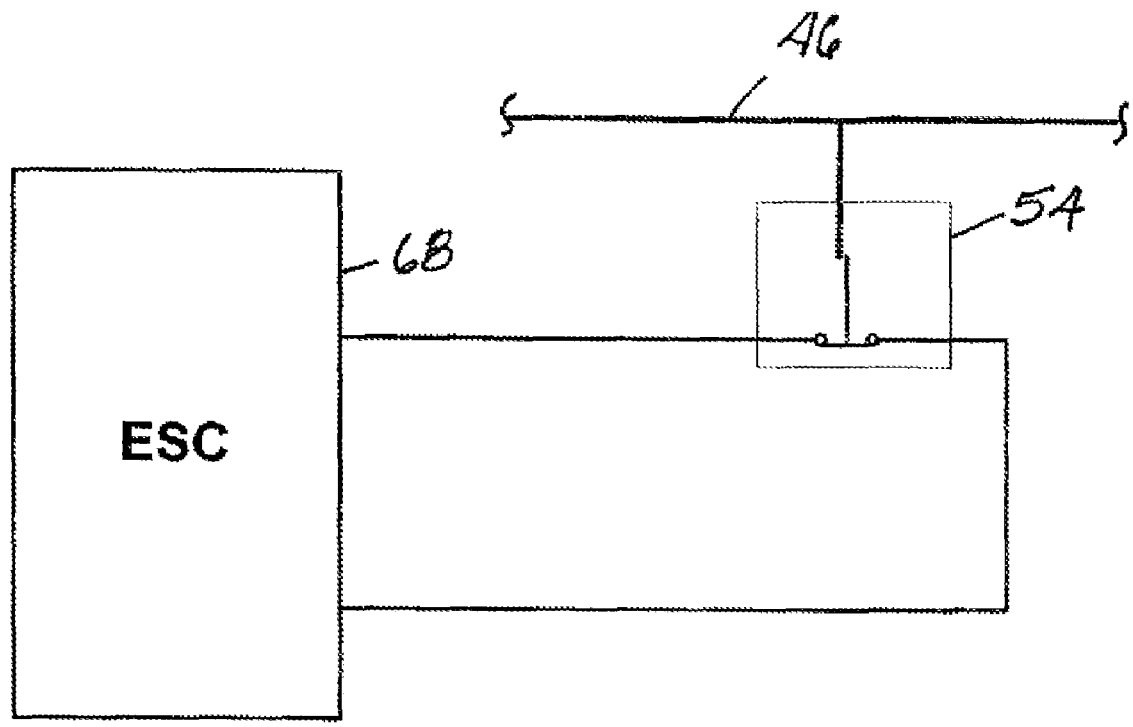
FIG. 4 is a schematic electrical diagram including an electrical system controller (ESC) that executes an algorithm in accordance with the strategy diagram of FIG. 3.

Switch 54 is associated with an electrical system controller (ESC) 68 of the vehicle electrical system as shown in FIG. 4. ESC 68 comprises a processor that is programmed in accordance with an algorithm 70, shown in FIG. 3, that iterates from time to time beginning at a start point 72.

A step 74 of the algorithm monitors the condition of switch 54. If the park brake is indicated as being released due to pressure in air line 46 being substantially nominal pressure provided by air tank 28, a step 76 of the algorithm monitors vehicle speed, as broadcast on a data link of the electrical system.

If the vehicle is indicated to be moving, a step 78 of the algorithm monitors switch 54 to ascertain if pressure has been lost in air line 46 in an amount large enough to indicate a possible imminent unintended application of the park brake. A decrease from the nominal air tank pressure that is present in air line 46 when the lift is in stow due to valve 56 being open, to a pressure that while still greater than the minimum pressure needed to keep the park brake from being applied, is indicative of the possibility of imminent unintended application of the park brake. Such a decrease in pressure can occur in the following way.

When the park brake is released and the lift is in stow, air line 46 is pressurized from the air tank through supply valve 36 and valve 45. If switch 37 is closed, thereby indicating the lift being in stow, solenoid 56S is energized to keep valve element 56V open for supplying tank air pressure to the pilot port of supply valve 36. That allows the park brake to be applied and released by operation of park brake knob 45. When switch 37 opens to indicate the lift having come out of stow, valve element 56V closes, causing line 58 to exhaust through an exhaust port 56E. Pilot pressure to supply valve 36 is thereby lost, and so it closes with line 40 being exhausted through valve 36 in the process.

Air pressure present in air line 46 then shuttles double check valve 38 to block it from air line 40. With line 40 blocked, a closed loop comprising double check valve 38, line 44, valve 45, and the portion of line 46 between the delivery port of valve 45 and valve 38 is created. In other words the entire portion of air circuit 26 from valve 38 to valve 48 is now shut off from air tank 28. Air leakage from that shut off portion will cause pressure in air line 46 to decrease. When pressure reaches the low pressure threshold of PPDC valve 45, it will "pop" and exhaust line 46, thereby applying the park brake.

If pressure in line 46 decreases significantly from the nominal tank pressure to some predetermined pressure above the low pressure threshold of PPDV valve 45, a step 80 activates an alarm to alert the driver. If not, the algorithm returns to step 72 via a step 82 that in the absence of any alarm being given, has no effect, but would be effective to de-activate an alarm that is being given.

Had step 74 indicated that the park brake was being applied, the algorithm would have not performed steps 76 and 78, and instead would have returned to step 72 via step 82.

Had step 76 indicated that the vehicle was not moving, the algorithm would have not performed step 78, and instead would have returned directly to step 72.

By using an existing alarm device or devices in the bus a separate additional alarm device is not required. Existing alarm devices are often capable of giving distinctive alarms for particular conditions, and it is preferred that such a device be used to give a unique alarm to warning of potential impending application of the park brake.

The invention can be implemented with minimal additional hardware and the connections into pre-existing electrical and air systems. Algorithm 70 can be implemented by suitable programming in a existing processor ESC 68.

While a presently preferred embodiment of the invention has been illustrated and described, it should be appreciated that principles of the invention apply to all embodiments falling within the scope of the following claims.

What is claimed is:

1. A motor vehicle comprising:
    a park brake operable by an operating device for selectively locking and unlocking wheels on which the vehicle travels;
    a pressurized air source;
    an air circuit for causing the operating device a) to operate the park brake to unlock the wheels when pressurized air from the pressurized air source, that acts on the operating device through an air line leading to the operating device, acts on the operating device with a nominal pressure that is sufficient to assure unlocking of the wheels and b) to operate the park brake to lock the wheels when air pressure acting through the air line on the operating device is less than some minimum pressure for keeping the wheels locked;
    a lift platform and associated lift mechanism that are selectively positionable c) to a deployed position that allows the lift platform to be raised and lowered by the lift mechanism when the vehicle is parked and d) to a stowed position that does not allow the lift platform to be raised and lowered by the lift mechanism;
    a selectively operable interlock valve connected in the air circuit for allowing pressurized air from the pressurized air source to act through the air line on the operating device whenever the lift platform and associated lift mechanism are indicated by an indicating device to be in the stowed position and for disallowing pressurized air from the pressurized air source to act through the air line on the operating device whenever the lift platform and associated lift mechanism are indicated by the indicating device not to be in the stowed position;
    a pressure-sensitive device for sensing air pressure in the air line leading to the operating device;
    and an indicator operated by the pressure-sensitive device when air pressure in the air line leading to the operating device has decreased significantly enough from the nominal pressure, but is still greater than the minimum pressure, to indicate the possibility of imminent locking of the wheels.

2. A motor vehicle as set forth in claim 1 wherein the interlock valve comprises a normally closed solenoid-operated valve that is operated open e) when an engine of the vehicle is running and f) a switch that is associated with the lift mechanism for distinguishing between the lift platform and associated lift mechanism being in the stowed position and in the deployed position indicates that the lift platform is in the stowed positions.

3. A motor vehicle as set forth in claim 1 wherein the pressure-sensitive device comprises a pressure-sensitive switch.

4. A motor vehicle as set forth in claim 1 wherein the air circuit comprises: a supply valve; a double check valve; and a push-pull double check valve; and
    the supply valve has a pilot port to which the interlock valve supplies pressurized air from the pressurized air source when the lift mechanism is indicated to be in the stowed position, a supply port that is communicated to the pressurized air source by a supply line, and a delivery port communicated to a first port of the double check valve;
    the double check valve further comprises second and third ports communicated respectively with respective ports of the push-pull double check valve;
    the air line leading to the operating mechanism being in common communication with one of the ports of the double check valve and one of the ports of the push-pull double check valve;
    and the push-pull double check valve being operable to selectively allow and disallow pressurized air supplied from the source through the supply valve to be delivered to the operating device through the air line leading to the operating device so long as the interlock valve is delivering pressurized air to the pilot port of the supply valve.

* * * * *